United States Patent [19]

Strickland et al.

[11] Patent Number: 5,096,578
[45] Date of Patent: Mar. 17, 1992

[54] VORTEX BREAKER FOR HORIZONTAL LIQUID DRAW OFF TRAY SUMP

[75] Inventors: John C. Strickland; Robert M. Steinberg, both of Houston, Tex.

[73] Assignee: Texaco Inc., White Plains, N.Y.

[21] Appl. No.: 567,509

[22] Filed: Aug. 15, 1990

[51] Int. Cl.⁵ .............................................. B01D 19/00
[52] U.S. Cl. .............................. 210/188; 55/192; 210/305; 210/538; 261/5; 261/108
[58] Field of Search .................. 423/576.4, 576.7; 261/110, 3, 5, 6, 108, 109; 210/188, 299, 305, 307, 532.1, 538, 521, 163, 511, 539, 540; 55/87, 185, 191, 192, 193, 159

[56] References Cited

U.S. PATENT DOCUMENTS

| | | | |
|---|---|---|---|
| 2,394,133 | 2/1946 | Zimmerman | 261/110 |
| 2,787,451 | 4/1957 | Lavery | 261/3 |
| 3,163,685 | 12/1964 | Gaede | 261/110 |
| 3,853,513 | 12/1974 | Carson | 55/185 |
| 4,105,723 | 8/1978 | Mix | 261/110 |
| 4,149,860 | 4/1979 | Kulik | 55/193 |
| 4,511,544 | 4/1985 | Connell et al. | 423/576.4 |
| 4,610,701 | 9/1986 | Hoffman | 55/87 |
| 4,696,741 | 9/1987 | Rahlwes | 210/540 |

Primary Examiner—Robert A. Dawson
Assistant Examiner—Joseph Drodge
Attorney, Agent, or Firm—Jack H. Park; Kenneth R. Priem; Richard A. Morgan

[57] ABSTRACT

A vortex breaker has been invented for a liquid draw off tray with horizontal liquid draw off. Liquid is removed from the sump of the tray horizontally through a port. A first vertically oriented baffle has a top edge above the port, a bottom edge below the port and a side edge adjacent the port. A second vertically oriented baffle is perpendicular to the first baffle. The second baffle has a top edge above the port and a bottom edge spaced from the sump bottom a distance to about one-half port diameter, allowing for the flow of liquid thereunder. The vortex breaker is useful for a liquid spare horizontal liquid draw off tray.

12 Claims, 1 Drawing Sheet

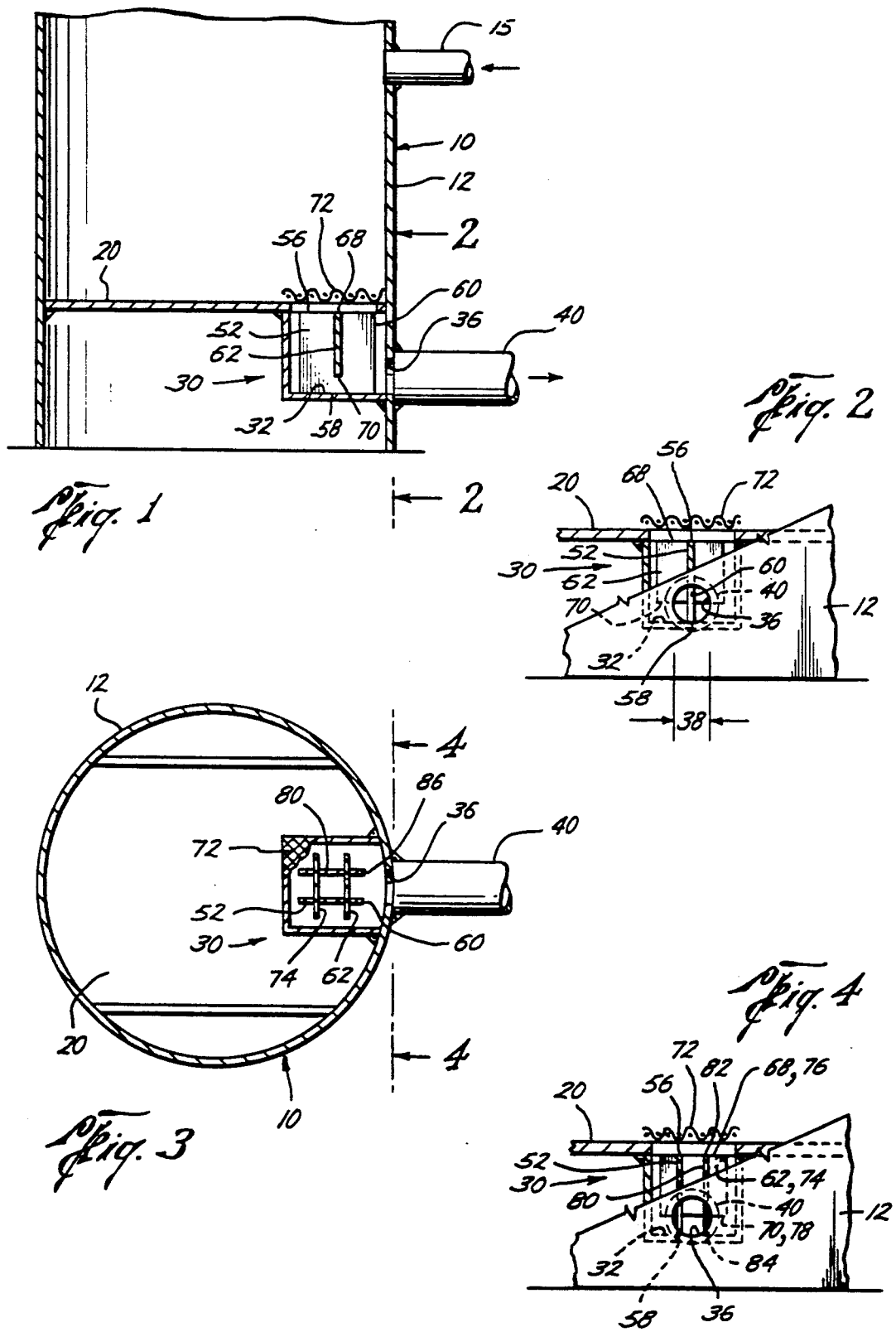

VORTEX BREAKER FOR HORIZONTAL LIQUID DRAW OFF TRAY SUMP

BACKGROUND OF THE INVENTION

1. Field Of The Invention

The invention relates to an apparatus for improving the separation of gases from liquids. More particularly the invention relates to a vortex breaker in combination with a liquid draw off tray. Most particularly the invention relates to a vortex breaker in a sump having a horizontal liquid draw off.

2. Description Of Other Related Methods In The Field

A vortex is a gas pocket trapped in a swirling liquid as the liquid is drawn downward. If a vortex is small enough, the gas pocket will remain localized. Larger vortices cause gas to be transported with the moving liquid. Vortices cause vapor to remain with liquid even where, according to good design practice, there is enough residence time and disengagement volume to allow the liquid and gas to separate completely.

Vortex breakers have been used to improve the separation of gases from liquids. Vortex breakers are typically used at the bottom of towers and separator drums at the point where liquid leaves the vessel. Many vortex breakers comprise a series of baffles which subdivide a disengagement volume. The subdivided volume prevents all but small vortices which as stated tend to remain localized.

U.S. Pat. No. 4,696,741 to W. C. Rahlwes discloses a vortex breaker for use in separating liquids of different densities. The vortex breaker comprises a specified arrangement of baffles at the liquid outlet positioned at the bottom of a vessel.

SUMMARY OF THE INVENTION

The invention is a vortex breaker which is positioned in the sump of a liquid draw off tray. The liquid draw off tray is part of a vessel in which two phases are separated.

The sump has a bottom surface and a port. The port provides fluid communication with a tubular liquid withdrawal conduit. The port has a diameter and is oriented for horizontal liquid flow.

The vortex breaker has a first baffle lying in a first vertical plane. The first baffle has an upper edge extending above the port, a lower edge extending to the sump bottom surface preventing under flow and a side edge lying adjacent the port.

A second baffle lies in a second vertical plane, perpendicular to the first vertical plane. The second baffle intersects the first baffle and has an upper edge extending above the port and a lower edge spaced from the sump bottom surface a distance of at least one-half port diameter, providing for under flow of liquid.

The invention has particular utility in preventing vortices in liquid draw off tray sumps with horizontal draw offs. In applications where the tray is spare in liquid there is particular susceptibility to vortices and the vortex breaker is effective.

BRIEF DESCRIPTION OF THE DRAWING

FIG. 1 is a vertical section through a vessel, liquid draw off tray and vortex breaker.

FIG. 2 is a partial section taken on line 2—2 of FIG. 1.

FIG. 3 is a horizontal section through a vessel, liquid draw off tray and vortex breaker.

FIG. 4 is a partial section taken on line 4—4 of FIG. 3.

DETAILED DESCRIPTION OF THE DRAWING

For a better understanding of the invention, and to show how the same may be carried out in its best mode for use, reference is now made, by way of Example, to FIG. 1, FIG. 2, FIG. 3 and FIG. 4.

Vessel 10 is a high pressure amine absorber in which a gaseous stream comprising hydrogen, light hydrocarbon and 3% hydrogen sulfide is contacted countercurrently with an aqueous diglycol amine solution to remove the hydrogen sulfide. The 6 foot diameter vessel 10 has a side wall 12 which will contain the 2700 psig pressure. In vessel 10, 550 gpm of hydrogen sulfide lean diglycol amine fed via fluid inlet means 15 is contacted with 18 $ft^3$/sec of gas. Contacting of the gas is made on 10 valve trays (not shown) and the hydrogen sulfide free gas leaves via the top of the tower. Liquid falls to liquid draw off tray 20, from which it is withdrawn from the vessel 10.

Liquid on draw off tray 20 flows into sump 30 and from there, horizontally out of vessel 10 through port 36 and through tubular liquid withdrawal conduit 40.

The liquid draw off tray 20 is periodically liquid spare, causing a vortex in sump 30. A vortex breaker is installed in sump 30. The vortex breaker comprises a first baffle 52 and a second baffle 62. First baffle 52 lies in a first vertical plane. First baffle 52 has an upper edge 56 extending above port 36; a lower edge 58 extending to the sump bottom surface 32 and a side edge 60 adjacent port 36. Liquid is prevented from flowing under first baffle 52 by the proximity of lower edge 58 to bottom surface 32.

Second baffle 62 is in a second vertical plane perpendicular to the first vertical plane. First baffle 52 and second baffle 62 intersect and may bisect each other. Second baffle 62 has an upper edge 68 extending above the port 36 and a lower edge 70 spaced from the sump bottom surface 32 a distance of at least one-half port diameter 38, preferably less than one port diameter 38, most preferably one-half port diameter 38 providing for flow thereunder.

In FIG. 2 and FIG. 3 are shown an alternate configuration with third baffle 74 and fourth baffle 80 which further subdivide the volume of sump 30. Third baffle 74 lies in a third vertical plane, parallel to the second vertical plane. Third baffle 74 has an upper edge 76 extending above the port 36 and a lower edge 78 spaced from the sump bottom surface 32 at least one-half port diameter 38, preferably less than one port diameter 38, most preferably one-half port diameter providing for the flow of liquid thereunder. Fourth baffle 80 lies in a fourth vertical plane. Fourth baffle 80 has an upper edge 82 extending above the port 36, a lower edge 84 extending to sump bottom surface 32 and a side edge 86 adjacent port 36.

Over sump 30 is grating 72 which not only prevents the flow of debris into sump 30 but also acts in combination with first baffle 52, second baffle 62 and third baffle 74 to prevent vortices from propagating.

In a 6 ft diameter vessel containing 10 valve trays, the sump is 16 inches wide, 10 inches long and 12 inches high. First baffle is 10 inches × 12 inches × 0.25 inches. Second baffle is 6 inches × 16 inches × 0.25 inches. First and second baffles are made of 0.25 inches 304 or 316L stainless steel welded together.

DETAILED DESCRIPTION OF THE INVENTION

Conventional vortex breakers are not applicable to horizontal liquid draw off. A new type of vortex breaker consists of two parts: a first baffle and a second baffle. Inclusion of a grating is a preferred embodiment. The grating is placed over the draw off tray sump and may cover the entire draw off tray. The grating catches solid particles, such as loose bolts, that would otherwise fall into the sump. The grating also provides some disruption of the swirling motion that can cause a vortex to form.

The first baffle is a thin vertical piece parallel to the liquid withdrawal port dividing the sump into two equal volumes. It is normally as high and long as the sump. The first baffle alters the liquid flow from one large flow to two smaller flows and significantly reduces the size of the vortices. There may be two or more first baffles in parallel. They are located to divide the nozzle entrance into equally sized portions and further reduce the size of the vortices.

The second baffle is a thin vertical piece perpendicular to the first baffle. It is as wide as and half as high as the sump. It is located at the top of the sump half way back from the port. Along with the first baffle it divides the trap pan into four equal volumes. This reduces each flow volume and thus the vortex size between the second baffle and the port. The flow paths behind the second baffle are reduced in size and forced to take a more tortuous path which tends to hinder the formation of vortices. Due to the slightly higher pressure drop through the rear path there will be more liquid flow through the front sections. The second baffle may be placed a little closer to the port than halfway back through the sump to allow equal flows through each section.

More than one second baffle can be used in parallel to further reduce the flow path. The second baffle does not have to be exactly half the height of the sump. However, the distance between the bottom of the second baffle and the bottom of the sump should be at least half the port internal diameter so that the flow will not be unduly constricted. The height of the second baffle should similarly be at least half the port internal diameter to impede swirling motion.

The baffles and grating may be welded or bolted together. Alternatively, they can be connected to the tower internals or the wall.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. In a vessel of the type in which two fluid phases are separated, said vessel having a wall,
    a fluid inlet means communicating with said vessel through said wall,
    a liquid draw off tray below said fluid inlet means, the tray containing a sump having a bottom surface and a horizontally oriented liquid draw off port,
    the improvement comprising: means for breaking vortices including,
    a first baffle lying in a first vertical plane, said first baffle having an upper edge extending above said port, a lower edge extending to said sump bottom surface and a side edge adjacent said port,
    a second baffle lying in a second vertical plane, perpendicular to said first vertical plane, said second baffle intersecting said first baffle and having an upper edge extending above said port, and a lower edge spaced from said sump bottom surface a distance of at least one-half the length of the liquid draw off port diameter.

2. The apparatus of claim 1 wherein said first baffle bisects said second baffle.

3. The apparatus of claim 1 wherein said second baffle bisects said first baffle.

4. The apparatus of claim 1 wherein said first baffle and said second baffle bisect each other.

5. The apparatus of claim 1 comprising a grating above the sump.

6. The apparatus of claim 1 wherein said second baffle lower edge is spaced from said sump bottom surface a distance of at least one-half the length of the liquid draw off port diameter and less than one length of the liquid draw off port diameter.

7. The apparatus of claim 1 wherein the second baffle lower edge is spaced from the sump bottom surface a distance of about one-half the length of the liquid draw off port diameter.

8. The apparatus of claim 1 comprising a third baffle lying in a third vertical plane, parallel to said second vertical plane, said third baffle intersecting said first baffle and having an upper edge extending above said port and a lower edge spaced from said sump bottom surface a distance of at least one-half the length of the liquid draw off port diameter.

9. In a vessel of the type in which two fluid phases are separated, said vessel having a side wall,
    a fluid inlet means communicating with said vessel through said side wall,
    a liquid draw off tray below said fluid inlet means, the tray comprising a horizontal tray surface and a sump, said sump having a bottom surface and a sump wall comprising a portion of said vessel side wall, a port in said sump wall having a diameter, and providing fluid communication with a liquid withdrawal conduit,
    the improvement comprising: a vortex breaker including,
    a first baffle lying in a first vertical plane, said first baffle having an upper edge extending above said port, a lower edge extending to said sump bottom surface and a side edge adjacent said port,
    a second baffle lying in a second vertical plane, perpendicular to said first vertical plane, said second baffle intersecting said first baffle and having an upper edge extending above said port, and a lower edge spaced from said sump bottom surface a distance of at least one-half the length of the liquid draw off port diameter, providing for the flow of liquid thereunder.

10. The vortex breaker of claim 9 comprising a grating positioned over said sump.

11. The vortex breaker of claim 9 comprising a third baffle, lying in a third vertical plane, parallel to said second vertical plane and intersecting said first baffle,
    said third baffle having an upper edge extending above said port, and a lower edge spaced from said sump bottom surface a distance of at least one-half the length of the liquid draw off port diameter, providing for the flow of liquid thereunder.

12. The vortex breaker of claim 9 comprising a fourth baffle, lying in a fourth vertical plane, and intersecting said second baffle, said fourth baffle having an upper edge extending above said port, a lower edge extending to said sump bottom surface and a side edge adjacent said port.

* * * * *